United States Patent
Derrick

(10) Patent No.: US 6,193,268 B1
(45) Date of Patent: Feb. 27, 2001

(54) STEERING WHEEL INCLUDING AN AIR BAG MODULE

(75) Inventor: John-Oliver Derrick, Hettstadt (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 09/217,745

(22) Filed: Dec. 21, 1998

(30) Foreign Application Priority Data

Dec. 24, 1997 (DE) ......................................... 297 22 8240 U

(51) Int. Cl.⁷ .................................................. B60R 21/16
(52) U.S. Cl. ........................................ 280/728.2; 280/731
(58) Field of Search ............................... 280/728.2, 731, 280/728.1, 728.3

(56) References Cited

U.S. PATENT DOCUMENTS

| | | | |
|---|---|---|---|
| 4,596,972 | * | 6/1986 | Knight et al. ......................... 355/281 |
| 5,333,897 | * | 8/1994 | Landis et al. ...................... 280/728 A |
| 5,580,082 | * | 12/1996 | Shiga et al. ......................... 280/728.3 |
| 5,599,039 | * | 2/1997 | Goss et al. ......................... 280/728.2 |
| 5,630,611 | * | 5/1997 | Goss et al. ......................... 280/728.2 |
| 5,639,113 | | 6/1997 | Goss et al. ......................... 280/728.2 |
| 5,738,369 | * | 4/1998 | Durrani ................................. 280/731 |
| 5,775,725 | * | 6/1998 | Hodac et al. ....................... 280/728.2 |
| 5,788,268 | * | 8/1998 | Goss et al. ......................... 280/728.2 |
| 5,947,509 | * | 9/1999 | Ricks et al. ........................ 280/728.2 |
| 6,017,055 | * | 1/2000 | Cuevas ............................... 280/728.2 |
| 6,029,992 | * | 2/2000 | Vendely et al. .................... 280/728.2 |

FOREIGN PATENT DOCUMENTS

| | | | |
|---|---|---|---|
| 19522313 | 1/1996 | (DE) | ................... 280/728.3 |
| 19503816 | 8/1996 | (DE) . | |
| 19501837 | 9/1996 | (DE) . | |
| 0754600 | 1/1997 | (EP) | ................... 280/728.3 |
| 0830990 | 3/1998 | (EP) | ................... 280/728.3 |

* cited by examiner

Primary Examiner—J. J. Swann
Assistant Examiner—J. Allen Shriver
(74) Attorney, Agent, or Firm—Tarolli, Sundheim, Covell, Tummino & Szabo L.L.P.

(57) ABSTRACT

A steering wheel unit includes a steering wheel defining an x-y plane. The steering wheel includes a steering wheel carcass (1), on which at least two mounting surface areas (2), at least two guide pegs (3), and at least two interlocking openings (4) having rims and guiding surface areas (9) are provided. The steering wheel unit further comprises an air bag module (6) with an inflator mount (5) being fitted to the steering wheel in a z direction perpendicular to the x-y plane. The air bag module (6) is secured immovable relative to the x-y plane and relative to the z direction. The inflator mount (5) has recesses (7) and interlocking tabs (8) made of an elastic material with latching protuberances (10). The mounting surface areas (2) extend parallel to the x-y plane.

8 Claims, 1 Drawing Sheet

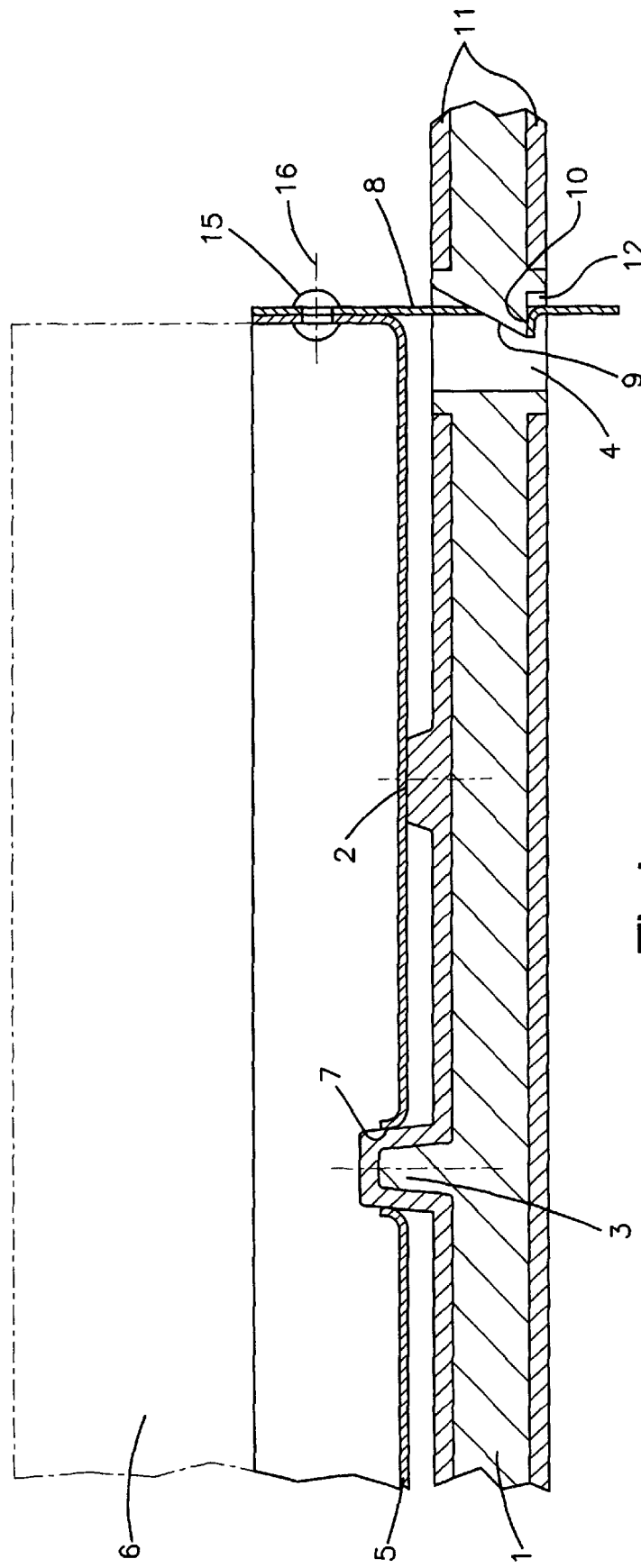

STEERING WHEEL INCLUDING AN AIR BAG MODULE

FIELD OF THE INVENTION

The invention relates to a steering wheel including an air bag module secured immovable relative to a fitting plane (x-y plane) as well as relative to a fitting direction (z direction) but releasable from the steering wheel.

BACKGROUND OF THE INVENTION

For securing an air bag module in a steering wheel numerous proposals have already been made. When the steering wheels are secured in final assembly by means of a nut screwed to the threaded end of the steering column the air bag module cannot be installed until after the steering wheel has been fitted since it takes up the central portion above the steering wheel hub which needs to remain free for screwing on the nut.

When so-called integrated air bags are to be provided in which the steering wheel is furnished together with the finish-assembled air bag for fitting to the steering column, then some other means of steering wheel fastening is required, for which likewise proposals have already been made, all of which, however, are more awkward to handle than the usual steering wheel fastening by a central nut successfully practiced a million-times over.

In this version—as mentioned—the air bag module cannot be fitted until the steering wheel has been mounted on the steering column and secured thereto.

Then, for securing the air bag module in the steering wheel screw, connectors need to be provided, the access points of which are not provided on the exposed surface of the steering wheel to avoid spoiling optical appeal. Having to insert screws and making the screw connections from the rear of the steering wheel is always a nuisance and time-consuming due to the restricted space availability. Since means of shaving final assembly time in current automotive production are always being sought, screw connectors, especially when needing to be made from the rear of the steering wheel are thus viewed as being a distinct drawback.

This is why attempts have also been made to secure air bag modules to the steering wheel by means of snap-in or clip connectors. However, experience has shown that conventional connectors of this kind fail to be suitable since they are incapable of accommodating the shock forces encountered in air bag activation or because these connectors unlatch when dynamically stressed. Connectors of this type are usually subjected in the locked position to a certain pretension to lock the snap-in or clip connection so that it cannot unlatch under normal conditions. On explosive inflation of an air bag, connectors of this kind are, however, first loaded in the sense of eliminating this pretension, resulting in the latching protuberances no longer being able to reliable clasp when the loading immediately follows in the pretensioning direction.

SUMMARY OF THE INVENTION

The object is thus to propose for a steering wheel of the aforementioned kind a means of securing the air bag which is speedy in final assembly, is concealed from the exposed surface of the steering wheel, requires no fiddling on the rear side of the steering wheel for fastening and is achievable simply and at low cost in the course of usual steps in producing the steering wheel and air bag module.

To achieve this object it is proposed in accordance with the invention to provide on the steering wheel carcass at least two mounting surface areas extending parallel to the fitting plane, at least two guide pegs spaced away from the mounting surface areas and protruding from the fitting plane in the fitting direction, as well as at least two interlocking openings extending vertically to the fitting plane and having guiding surface areas inclined relative to the fitting direction, and the air bag module comprising an inflator mount located opposite the steering wheel carcass, the inflator mount having recesses corresponding to the guide pegs as well as interlocking tabs made of an elastic material and corresponding to the interlocking openings, these interlocking tabs being elastically deflected from their resting position vertically to the fitting direction by the guiding surface areas when the air bag module is fitted and returning to their resting position in the final assembly position to clasp the rim of the interlocking openings by a latching protuberance.

BRIEF DESCRIPTION OF THE DRAWING

Advantageous further aspects of the gist of the invention read from the sub-claims 2 to 8. Further details will now be discussed by way of an example embodiment as shown in the drawing in which:

FIG. 1 is a section through a portion of a steering wheel carcass 1 and an inflator mount 5, the air bag module 6 being merely indicated by the broken line.

DETAILED DESCRIPTION OF EMBODIMENT

In the example embodiment the steering wheel carcass 1 is provided with a sheathing 11 in which the mounting surface areas 2 are configured parallel to the fitting plane. Also configured on the steering wheel carcass 1 are guide pegs 3 which are concealed by the sheathing 11 and engage recesses 7 on the inflator mount 5.

Provided laterally spaced away from the mounting surface area 2 in the steering wheel carcass 1 is an interlocking opening 4 extending vertically to the fitting plane into which the interlocking tab 8 of an elastic material connected to the inflator mount 5 is able to engage when the air bag module 6 together with the inflator mount 5 is mounted on the steering wheel, whereby the lower end of the interlocking tabs is elastically deflected from its resting position vertically to the fitting direction by an inclined guiding surface area 9 of the interlocking opening 4. In the final assembly position the tabs are able to return to their resting position and clasp the rim of the interlocking opening 4 by a latching protuberance 10. In this arrangement the dimensions are selected so that the sheathing 11 is elastically deformable in the region of the mounting surface areas 2 in the fitted condition to the extent that the latching protuberances 10 are durably urged against the rear side rim of the interlocking opening 4 pretensioned. As an alternative the bottom of the inflator mount 5 may be configured so that it bends slightly in the latching action and thereby itself providing the necessary pretension of the latching connection.

The interlocking tab 8 may be formed in one piece with the material of the inflator mount 5 by a fastener, or rivet 15, with an axis 16 parallel to the fitting plane (x-y plane) or—as is shown—riveted to the inflator mount 5. Provided between the interlocking tab 8 and the steering wheel carcass 1 is an engage gap 12 into which a tool, such as for example, a screwdriver may be inserted from the rear side of the steering wheel, the latching connection being releasable by turning the screwdriver.

The fastener proposed in accordance with the invention for securing an air bag module in a steering wheel achieves all of the objects stated at the outset and has passed numerous tests in which the air bags were explosively inflated in accordance with requirements within the usual parameter ranges. As regards its strength, the connection may be designed with no problem to withstand the shock forces anticipated, without any accidental unlatching due to the opposing dynamic stresses, thus attaining the objective of providing an air bag fastener which is simple to handle in final assembly without having to put up with any drawbacks regarding the air bag functions.

What is claimed is:

1. A steering wheel unit comprising a steering wheel defining an x-y plane, said steering wheel including a steering wheel carcass and having a sheathing covering part of the carcass, said steering wheel having at least two mounting surface areas, at least two guide pegs, and at least two interlocking openings having rims and guiding surface areas, said sheathing forming said mounting surface areas and at least part of said guide pegs, said steering wheel unit further comprising an air bag module with an inflator mount being fitted to said steering wheel in a z direction perpendicular to said x-y plane, said air bag module being secured immovable relative to said x-y plane and relative to the z direction perpendicular to said x-y plane, said inflator mount having recesses, said inflator mount further having a plurality of interlocking tabs made of an elastic material, each said tab having an opening and a latching protuberance adjacent the opening, each of said latching protuberances adapted to engage corresponding parts of said guiding surface areas, said inflator mount being located opposite said steering wheel carcass, said mounting surface areas extending parallel to the x-y plane, said guide pegs being spaced away from said mounting surface areas and protruding from said x-y plane in said z direction, said interlocking tabs extending perpendicularly to said x-y plane and being deflectable from a resting position, said guiding surface areas of said interlocking openings being inclined relative to said z direction, said recesses being configured corresponding to said guide pegs to receive said guide pegs, said interlocking tabs being configured corresponding to said interlocking openings and being elastically deflected from said resting position perpendicularly to said z direction by said guiding surface areas when said air bag module is being fitted and returning to said resting position to clasp said rims of said interlocking openings by said latching protuberances when fitting of said air bag module is completed.

2. The steering wheel unit as set forth in claim 1 wherein said sheathing is made of an expanded plastics material.

3. The steering wheel unit as set forth in claim 2 wherein said mounting surface areas and said interlocking openings on said steering wheel carcass, on the one hand, and said interlocking tabs with said latching protuberances, on the other hand, are adapted to each other such that said sheathing in the fitted condition is elastically deformed in said region of said mounting surface areas to the extent that said latching protuberances are durably urged against a rear side of said rims of said interlocking openings.

4. The steering wheel unit as set forth in claim 1 wherein said recesses in said inflator mount comprise rims crimped inwardly.

5. The steering wheel unit as set forth in the claim 1 wherein said interlocking tabs are made of spring steel.

6. The steering wheel unit as set forth in claim 5 wherein said interlocking tabs are riveted to portions of said inflator mount oriented in said fitting direction.

7. The steering wheel unit as set forth in the claim 1 wherein said latching protuberances of said interlocking tabs can be turned from said resting position into an unlatching position by a tool.

8. The steering wheel unit as set forth in claim 1 wherein said interlocking tabs are secured to said inflator mount by fasteners with axes parallel to the x-y plane.

* * * * *

UNITED STATES PATENT AND TRADEMARK OFFICE
CERTIFICATE OF CORRECTION

PATENT NO. : 6,193,268 B1 Page 1 of 1
DATED : February 27, 2001
INVENTOR(S) : John-Oliver Derrick It is certified that error appears in the above-identified patent and that said Letters Patent is hereby corrected as shown below:

<u>Title page,</u>
Item [30], Foreign Application Priority Data, change "297 22 8240U" to
-- 297 22 824.2 --.

Signed and Sealed this

Eighteenth Day of June, 2002

*Attest:*

*Attesting Officer*

JAMES E. ROGAN
*Director of the United States Patent and Trademark Office*